United States Patent [19]

Rizzi et al.

[11] 3,742,592

[45] July 3, 1973

[54] ELECTRICALLY ALTERABLE INTEGRATED CIRCUIT READ ONLY MEMORY UNIT AND PROCESS OF MANUFACTURING

[75] Inventors: Joseph D. Rizzi, Los Gatos; Lloyd D. Fagan, Santa Clara, both of Calif.

[73] Assignee: Intersil Incorporated, Cupertino, Calif.

[22] Filed: May 3, 1971

[21] Appl. No.: 139,705

Related U.S. Application Data

[63] Continuation-in-part of Ser. No. 54,531, July 13, 1970, abandoned.

[52] U.S. Cl. 29/574, 29/584, 340/173 SP

[51] Int. Cl. B01j 17/00

[58] Field of Search 29/574, 584, 585, 29/586

[56] References Cited

UNITED STATES PATENTS

| | | | |
|---|---|---|---|
| 3,641,516 | 2/1972 | Castrucci et al. | 340/170 SP |
| 3,423,822 | 1/1969 | Davidson et al. | 29/574 |

*Primary Examiner*—Charles W. Lanham
*Assistant Examiner*—W. Tupman
*Attorney*—Gregg, Hendricson & Caplan

[57] ABSTRACT

An integrated circuit read only memory matrix comprised of transistors having emitter and collector contacts connecting rows and columns. Selected base-emitter junctions are electrically shorted by the application of successive reverse current pulses therethrough while monitoring junction resistance to thereby establish single PN junctions at such selected connections.

6 Claims, 7 Drawing Figures

INVENTOR
JOSEPH D. RIZZI
LLOYD D. FAGAN
ATTORNEYS

INVENTOR.
JOSEPH D. RIZZI
LLOYD D. FAGAN

Gregg, Hendricson & Caplan
ATTORNEYS

ELECTRICALLY ALTERABLE INTEGRATED CIRCUIT READ ONLY MEMORY UNIT AND PROCESS OF MANUFACTURING

This is a continuation of U.S. patent application Ser. No. 54,531 filed in the U. S. Patent Office on July 13, 1970 now abandoned.

BACKGROUND OF INVENTION

One type of semiconductor memory unit is the type generally denominated a read only memory generally comprising a matrix of electrically conducting rows and columns connected at desired intersections by diodes. This type of memory unit is limited in that only the information originally applied thereto in the form of particular diode connections can be retrieved from the unit and subsequent changes in the information are not possible. Read only memory units, hereinafter abbreviated ROM's, have however found wide favor in the art inasmuch as there are many applications therefor and the cost, size and complexity is materially less than other types of memory units.

An advance in the semiconductor art has been the development of integrated circuit ROM's. This advance is particularly desirable in view of the relatively large number of memory locations required for most applications. A 256 unit matrix is quite common and multiples thereof are desirable. Such a matrix becomes truly practical and economical when formed as an integrated circuit.

Considering further conventional integrated ROM's, it is noted that for each complete set of information storage therein it is necessary to mask a semiconductor wafer and diffuse or connect diodes at particular points therein. This has the material disadvantage of time consumption for mask formation and substantial initial cost. In this respect it has been proposed that an electrically alterable ROM would be advantageous and attempts have been made to produce an electrically alterable ROM. In this general category of prior art there may be found devices employing fuses, i.e., electrical conductors that are designed to separate or burn out upon the passage of sufficient current therethrough. Devices of this general type normally employ a nichrome wire or conductor connecting individual diodes to either column or row of a matrix. Certain well known difficulties attend this solution to the problem and among these difficulties are the extra processing required to form the fuse and the necessary physical space required when same is applied to integrated circuits.

An alternative approach to the formation of an electrically alterable ROM is the possibility of employing a pair of diodes connected between each crossover of row and column in a diode matrix. It is known to be possible to electrically short a diode by the application of sufficient power in a reverse voltage direction thereacross. This proposal has in fact been made and is covered by at least one issued U.S. patent. The electrical shorting of diodes has long been known in the art. It may be postulated that diode shorting originally occurred through inadvertent application of excessive reverse voltage across diodes but the field has been exploited to the extent of various suggestions and possible devices utilizing intentional diode shorting. Such electrical shorting has, however, been applied to individual diodes physically separated from other semiconductor devices. This general teaching has not been found applicable to the field of integrated circuits.

The present invention is particularly directed to integrated circuit read only memory matrices. In order to place the present invention in the proper context it is necessary to understand the general limitations of integrated circuits. Without attempting to define integrated circuits or to give any detailed discussion thereof, it is briefly noted that an integrated circuit transistor formed in conventional manner by diffusion processing generally has a base depth of the order 1.0 to 4.0 microns, an emitter depth of 0.5 to 3.0 microns and a base width between base-emitter junction and base-collector junction of 0.5 to 2.0 microns. The entire depth of an epitaxial layer within which the transistor is diffused does not normally exceed 10 microns. These size limitations generally recognized throughout industry pose numerous limitations on processes and structures that may be incorporated in integrated circuits. In particular it is noted that electrical shorting of a PN junction produces effects over some physical distance on each side of the junction itself. It has been found in this respect that circuit over-voltage of a PN junction in a reverse direction causing junction failure quite often also causes failure of the adjacent PN junction because of the particularly close proximity of the two junctions in the transistor. The present invention operates to overcome this problem so as to controllably electrically short a single predetermined PN junction of a transistor in a ROM matrix to thus achieve a truly practical electrically alterable IC ROM matrix.

SUMMARY OF INVENTION

There is provided by the present invention a process of manufacturing integrated circuit READ ONLY MEMORY devices by the diffusion of two back-to-back PN junctions at each intersection of electrically conducting rows and columns. Thus each matrix junction has the equivalent of a diffused transistor connected thereacross to provide what may be termed a "blank" from which any desired ROM may be readily formed after manufacture. In the following description the two back-to-back PN junctions are termed a transistor although no transistor action is involved and further transistor terminology is employed as to junction identity.

The present invention further provides for the programmed electrical shorting of one of the two PN junctions such as the base-emitter junctions of predetermined transistors in accordance with any desired ROM program to thus establish single PN junctions where desired for such program or information storage. There is produced by this process an integrated circuit matrix with permanent information storage without the necessity of establishing a different mask pattern for each different memory unit.

The necessarily close proximity of emitter base junction and collector base junction in integrated circuit transistors poses a major problem to the controlled shorting of but one of these junctions. The method of the present invention provides for the successive application of reverse current pulses through the base-emitter junction while monitoring the resistance of this junction so as to achieve the desired junction shorting without damage to the collector base junction. Monitoring is herein accomplished by the application of low current monitoring pulses through the base-emitter junction. It will be appreciated that there are a variety of ways to monitor the extent of junction shorting but the one employed herein is advantageous in being compatible with auxiliary circuitry employed in a complete integrated circuit ROM. As the base-emitter junction is progressively shorted or degraded, the resistance of the junction to the passage of monitoring pulses is measured. When the reverse biased junction resistance is reduced to a predetermined value the application of power pulses is terminated. Damage to or shorting of the collector-base junction can be precluded in the present invention by the proper choice of reverse base-emitter junction resistance. There is thus achieved hereby a truly practical and highly reliable process for electrically programming an integrated circuit read only memory matrix.

DESCRIPTION OF FIGURES

The present invention is illustrated as to relevant prior art, particular steps in the process of the present invention, and preferred embodiments of this invention in the accompanying drawings wherein.

DESCRIPTION OF PREFERRED EMBODIMENTS

Figure 1:
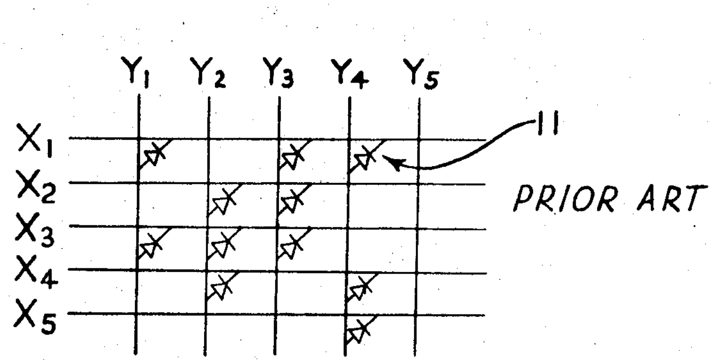
FIG. 1 is a schematic illustration of a prior art diode matrix.

As a prelude to a description of the present invention, reference is made to FIG. 1 of the drawings schematically illustrating a conventional prior art diode matrix. The matrix is formed as a plurality of substantially parallel electrically conducting rows $X_1$ to $X_5$ or more and a second plurality of spaced-apart parallel conducting columns $Y_1$ to $Y_5$ or more which are disposed normal to the rows but out of contact therewith. Normally the columns and rows are disposed at separate levels and diodes 11 are connected between particular predetermined columns and rows. This is generally indicated in FIG. 1 without regard to any particular information to be stored therein. Information is stored in the matrix in the binary state wherein the presence of a diode represents one of two binary states such that, for example, application of a signal at $X_1$ will produce an output at $Y_1$ possibly as an indication of a binary 1 but will produce no output at $Y_2$ as an indication of a binary 0. It will be appreciated that particular rows and columns are connected together to thus establish desired binary states which represent information such as, for example, a computer program to be stored in the memory of a matrix. Inasmuch as the physical connection of diodes is permanent, it is not possible for the user to vary the information stored in the matrix and thus it is commonly termed a READ ONLY MEMORY device or circuit. The information originally built into the matrix is the only information retained therein and thus it can only be read and not changed.

Prior art matrices may, as noted above, be formed of discrete components such as separate electrical wires for the rows and columns and small separate diodes electrically connected therebetween. Alternatively the matrix may be formed as an integrated circuit with the diodes formed by diffusion into the substrate of a die.

The present invention relates to an integrated circuit matrix. Although the prior art in the field of semiconductors provides teaching relative to electrical shorting of PN junctions such teaching is not applicable to selective shorting of one of a pair of PN junctions located as close together as is required for a practical integrated circuit. With two PN junctions separated by the small distance of 2 to ½ micron, for example, as is normally the case in bipolar integrated circuit transistors, the application of a single large reverse current pulse through a base-emitter junction, for example, oftentimes damages or degrades the adjacent base-collector junction. The process of this invention precludes this difficulty to thus achieve a truly practical end result. This end result is in fact the electrical equivalent of the matrix illustrated in FIG. 1 but within a single minute die of semiconducting material.

Figure 2:
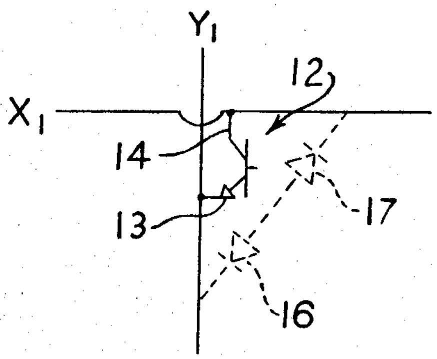
FIG. 2 is a schematic illustration of a single crossover connection in accordance with the present invention and indicating the PN junctions in the original connection.

Referring now to FIG. 2 of the drawing there will be seen to be shown a single electrical conductor such as a column $Y_1$ of the matrix and a single crossing conductor such as a row $X_1$ of the matrix. The row and column are not in electrical contact but in accordance with the present invention there is provided a transistor 12 having the collector 14 thereof connected to the conductor $X_1$ and the emitter thereof connected to the conductor $Y_1$. The base of the transistor remains unconnected. It will be appreciated that a transistor comprises two back-to-back PN junctions as illustrated, for example, by the back-to-back diodes 16 and 17 in FIG. 2. Electrical conduction through two back-to-back diodes such as diodes 16 and 17 is prevented in both directions within the limits of circuit operating voltage and thus, with the transistor connected as shown in FIG. 2, no conductive path is provided between the row $X_1$ and column $Y_1$.

Figure 3:
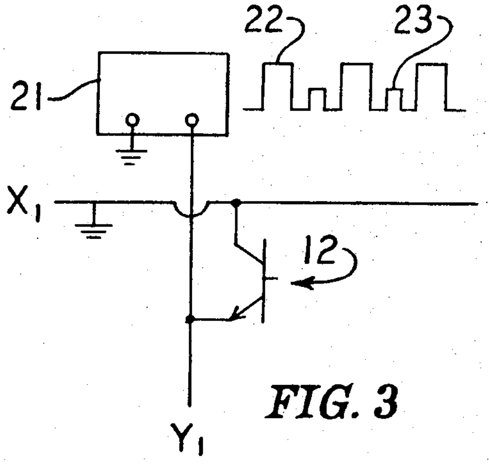
FIG. 3 is a schematic illustration of a diode connection formation in accordance with the present invention.

The present invention provides for intentional shorting of one of the two back-to-back PN junctions or transistor junctions at selected interconnections of rows and columns of an integrated circuit ROM. For example the base-emitter junction of selected transistors may be shorted in accordance with the process hereof so as to leave only the base-collector junction as the equivalent of a single diode connected between a row and column of a matrix at any particular row and column intersection. Reference is now made to FIG. 3 of the drawings wherein there is illustrated a single transistor 12 of an integrated circuit ROM matrix connected in this instance between a conductor of row $X_1$ and a conductor of column $Y_1$. This transistor 12, as noted above, provides the equivalent of an open circuit between the row and column illustrated under the conditions of normal circuit voltages inasmuch as the transistor does in fact comprise a pair of back-to-back PN junctions. In order to alter the electrical characteristics of this connection the present invention proceeds to electrically short or degrade one of the PN junctions of the transistor 12. In order to short the base-emitter junction 13 of the transistor the present invention provides for forcing a current to flow in a reverse direction through this junction from $Y_1$ to $X_1$. In order however, not to electrically short the base collector junction 14 of the transistor 12 the present invention provides for the application of a pulsed current of predetermined amplitude and duration for each such pulse across the base-emitter junction. In practice this pulsed current is forced from the emitter to the collector of the transistor 12, however, it will be appreciated that the current is applied in a forward direction across the base-collector junction while being applied in a reverse direction across the base-emitter junction.

As illustrated in FIG. 3 of the drawings, a pulse generator 21 is connected with the negative terminal thereof electrically grounded and the positive terminal connected to column $Y_1$. Row $X_1$ of the matrix is also electrically grounded and thus the output of the pulse generator 21 will be seen to be in fact applied between the emitter and collector of the transistor 12. The pulse generator may apply constant voltage pulses or constant current pulses, however, it is convenient in practice to employ constant current pulses and such is described below. Particularly in distinction to prior art shorting of PN junctions the present invention provides for a very precisely controlled degrading of the junction so as to achieve a required or desired limited resistance across the junction without effecting the base-collector junction disposed in close proximity thereto. Thus the process of the present invention proceeds to apply a pulsed current of sufficient magnitude to cause degradation of the base-emitter junction of the selected transistor and it has been found suitable to cause a current flow of the order 100 times the rated transistor current. In this respect it is further noted that transistor junction destruction or degrading is in part a function of average power applied and consequently it is necessary in accordance with the present invention to limit not only the pulse height but also the pulse width inasmuch as the power applied is a function of the product of the pulse height and pulse width. While it may be possible to ignore these limitations with respect to the shorting or degrading of a single transistor junction, it is of particular importance in accordance with the present invention that these parameters be carefully controlled in the shorting of one PN junction of an integrated circuit transistor wherein it is necessary that the other PN junction be unaffected by the operation of the process.

Figure 7:
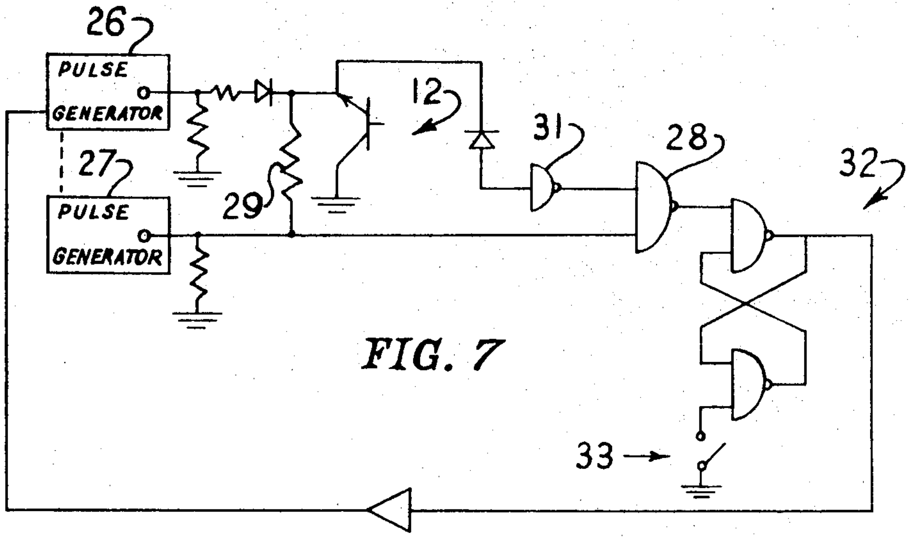
FIG. 7 is a circuit diagram of a shorting and monitoring circuit as may be employed to form single junction matrix connections in accordance with the present invention.

The process of the present invention additionally provides for the application of small monitoring pulses 23 in a reverse direction across the base-emitter junction to be shorted. These monitoring pulses are interleaved with the power pulses 22, as indicated in FIG. 3. In practice the train of power and monitoring pulses may be continuous, i.e., of different current levels or may be discontinuous as illustrated. With prior knowledge of the parameters and characteristics of the transistor being operated upon the magnitude of the monitoring pulse may be chosen so that a specified monitor voltage will be developed across the transistor when the base-emitter junction is shorted to the desired extent. When such a signal is developed by the monitoring pulse this is employed to terminate application of power pulses and consequently to stop the shorting procedure. A variety of different circuits may be employed to the end of controlling shorting by monitoring and one such circuit is illustrated in FIG. 7. Referring to this figure there will be seen to be provided a main current pulse generator 26 applying successive power pulses to the emitter of the transistor 12 to be operated upon. The collector of this transistor is grounded and the pulses applied are positive going. The circuit also provides for applying monitoring current pulses from a check pulse generator 27 with the monitoring pulses being interleaved between the main pulses, as described above. The monitoring pulses are applied to a NAND unit 28 and through a resistor 29 to the juncture of the transistor emitter and a line leading to the other input of the NAND unit 28 through an inverter 31. The output of the NAND circuit 28 is applied to a latching circuit 32 having the other input connected through a switch 33 to ground and the output connected through an amplifier to gate the main pulse generator 26. This circuit then operates to apply main power pulses from the generator 26 across the collector-emitter connections of the transistor 12 and to monitor the resistance between these two connections after each power pulse applied thereto. Monitoring is accomplished by application of a small monitoring pulse from the generator 27 between each power pulse, with the monitoring pulse being applied across the transistor through the resistor 29 and also the NAND unit 28. At such time as the resistance of the transistor decreases to a predetermined value, as set by the magnitude of the resistor 29, there will be applied to the NAND circuit 28 two positive inputs which produce a zero output to operate the latching circuit 32 so that the main pulse generator 26 is gated to an "off" condition. Another transistor 12 is then tested and operation of the circuit commences by closing the switch 33 to switch the latching circuit 32 to the opposite condition wherein the output thereof gates the main pulse generator 26 on.

Figure 6:
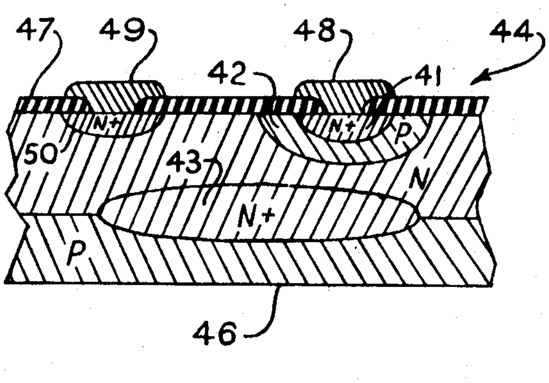
FIG. 6 is a schematic illustration of diffusion layers of a transistor formed in accordance with the present invention as a portion of the ROM matrix of this invention.

The present invention will be seen to operate upon the basis of predictably producing electrical shorting of a PN junction in a transistor. It is known in the prior art that transistor junctions or PN junctions may be destroyed or electrically shorted, thus the process of the present invention proceeds in accordance with general prior art theory. However, the question may yet arise as to just what mechanism is involved in shorting of the junction. It may be postulated that metal atoms from an ohmic contact of the emitter actually migrate through the emitter-base junction. In this respect reference is made to FIG. 6 wherein there is shown a portion of an ROM integrated circuit device. A single transistor of the device is shown in FIG. 6 to include an emitter region 41, a base region 42 and a common collector region 43 which in fact serves as one row or column of the matrix, inasmuch as this collector is in fact common to a plurality of transistors aligned, for example horizontally across the matrix. The transistor 44 may, in accordance with conventional practice, be formed by diffusion of a donor impurity into silicon to form the common collector 43 followed by diffusion of an acceptor type impurity to form the P type base and diffusion of a donor impurity to produce a heavily doped emitter region identified as N+. Atop the silicon wafer there is provided an oxide coating 47 for protection of the surface and PN junctions extending thereto as an electrical insulation thereover.

Atop the die 46 there is provided an ohmic contact 48 formed, for example, of aluminum extending through an opening etched in the oxide layer 47 to provide the emitter contact of the transistor. There is also provided an ohmic contact 49 to a common collector contact region 50 as, for example, by aluminum deposited upon the oxide layer 47 and extending through an opening etched therein to provide ohmic contact with the collector as shown. Please note that in this configuration it is not necessary to provide connection to the base region 42 and this then has the material advantage of requiring no lateral extent of the base region to afford a place for contacting same. Consequently the physical size of the individual transistor is materially reduced over the conventional configuration. Also note that the common collector region 50 at the ohmic contact is in fact resistively connected to the collector 43 internally through the N type silicon in conventional manner.

With the above-noted transistor configuration which is, of course, repeated for each transistor of the matrix, the application of electrical power between the emitter contact 48 and collector contact 49 causes a current to flow between these contacts through the emitter-base junction and base-collector junction. As noted above, there is applied a voltage in excess of that for which the transistor is rated to operate. It may be postulated that this then causes a migration of metal atoms from the ohmic contact 48 through the emitter and the emitter-base junction so as to provide an electrical short thereacross. Whatever the mechanism of junction shorting, it is known that same is a function of applied power. Thus there must be applied a current of sufficient magnitude to cause the emitter-base junction to short in a reasonable time. While it would be possible to short the PN junction desired by application of sufficient electrical energy in the form of a constant high current, it is noted that it is also possible in this manner to short the base-collector junction. This would then provide a direct short between the transistor contacts so as to result in an unusable product. Consequently the present invention provides for application of power in a pulsed fashion with intermediate monitoring between each pulse application to thus provide a very precise control over the degree of shorting of the base-emitter junction only. As soon as the reverse current flow resistance of this base-emitter junction of the transistor is reduced to a predetermined value, the application of pulse power is terminated as, for example, in the manner illustrated by the circuit of FIG. 7. Obviously the pulse width of applied power is controllable and the narrower the pulse width the greater the precision of ultimate shorted resistance of the base-emitter junction that may be obtained.

Further with regard to various parameters of the present invention, it is noted that the total depth of the base region in the transistor of FIG. 6 may be of the order of 2 microns with the distance between the base-emitter junction and base-collector junction being of the order of ½ micron. With such a silicon transistor there may, for example, be employed a power or main pulse having a current of 150 to 200 milliamperes to consequently produce the desired short. The current required is a function of the size and geometry of the transistor. It will be appreciated that if the applied current is reduced the current is required to flow for a greater time in order to produce the same result. This time might be provided by the utilization of a larger number of pulses or the extension of the pulse width, although the former is preferable. It is, however, necessary to apply to the transistor a voltage sufficient to cause reverse conduction through the base-emitter junction and one type of conventional transistor thus requires an applied main pulse voltage in excess of 7 volts.

Figure 4:
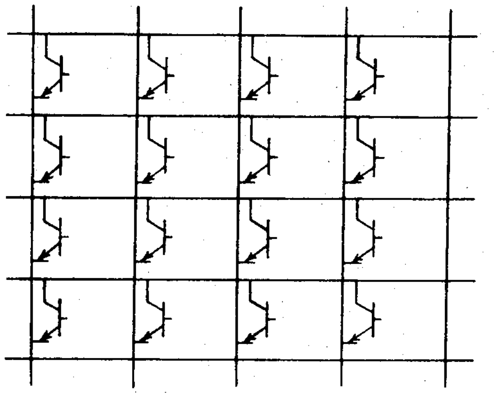
FIG. 4 is a schematic illustration of a matrix "blank" in accordance with the present invention.

There is produced by the present invention a matrix such as illustrated, for example, in FIG. 4. The circuit of FIG. 4 may comprise the original diffused "blank" from which any number of patterns may be formed in accordance with the desired information to be stored therein. The process of the present invention has been described above in connection with the operation upon a single transistor of the matrix; however, it will, of course, be appreciated that such operation is carried out upon each transistor which is to have the base-emitter junction thereof shorted so as to produce the same result as prior art processes wherein single diodes are diffused at selected points in the matrix. Shorting of the base-emitter junction of the transistor removes one of the oppositely disposed diodes of the transistor from the connection between rows and columns to consequently leave only a single PN junction, i.e., a diode electrically connected between the particular row and column. Insofar as practical application of the present invention is concerned, it is particularly noted that the manufacturer originally diffuses selected donor and acceptor impurities through an appropriate mask and through successive steps in accordance with transistor technology to thus produce what may be termed a "blank" having the electrical configuration such as that illustrated in FIG. 4. Each row of the matrix is connected through a separate transistor to each column of the matrix and it is noted that no attempt is made in FIG. 4 to show a complete matrix but rather to illustrate the electrical connections thereof. Each matrix blank is identical and yet customers require entirely different matrix connections. These different connections are readily formed in accordance with the present invention merely by applying to appropriate rows and columns electrical energization, in pulse form as discussed above, to short the base-emitter junctions of selected transistors so as to thus produce a single junction at such locations. A single junction is in effect a diode and thus this process then produces a diode matrix, for those transistors that are not operated upon present the equivalent of an open circuit, i.e., the absence of any diode connection at all. The program or information to be stored for any particular application or customer is readily applied to a control unit, as for example, by means of a punched card so that this control unit then operates the main pulse generators for each selected transistor together with the check pulse generators so that the information of the punched card is permanently stored in the READ ONLY MEMORY. Any desired number of identical memory units may be produced from a single punched card wherein some type of conventional reader in the control unit takes the information from the card and applies it to the appropriate controls for actuating the pulse generators.

In order to make a different ROM, it is only necessary to insert a different punch card into the control unit. Thus the purchaser of the matrix is not required to pay for the cost of separate masking and diffusion for each different ROM. As an example, an ROM having 256 possible junctions may actually cost about $10.00 to a purchaser except in accordance with present practices it would be necessary to construct a separate mask costing possibly $500.00 in order to produce the ROM. The present invention removes this very substantial masking cost from the cost of separate and different ROM's. In addition to reduced manufacturing cost, the invention provides for substantially shorter production time for a given ROM pattern. Consequently the material advantages of the present invention are believed to be evident.

Figure 5:
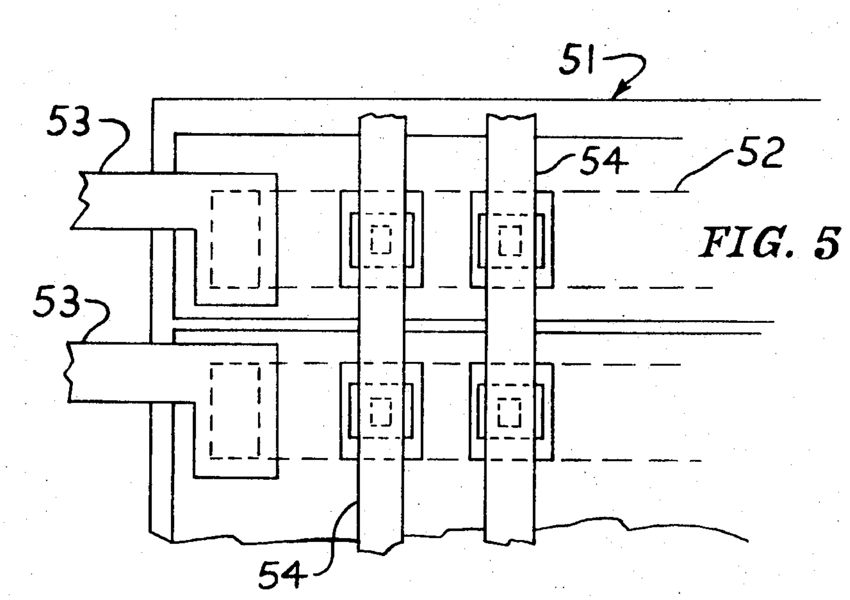
FIG. 5 is a partial plan view of a READ ONLY matrix in accordance with the present invention.

With regard to a practical embodiment of the present invention, reference is made to FIG. 5 schematically illustrating a portion of a die having impurities diffused therein in accordance with conventional transistor manufacturing practices to form a portion of the matrix which is completed by the fabrication of metal contacts thereon. Referring now to FIG. 5 there will be seen to be shown a portion of a die 51 formed of single crystal silicon, for example, and having diffused therein parallel submerged channels 52 of *n*-type material contacted at the surface on one end of each channel whereat metal is deposited to form collector electrodes 53. Successive transistors are formed along each of the rows 52 by the diffusion of base and emitter regions into the die in accordance with conventional practice. The electrically conducting columns of the matrix are formed by the deposition of a metal such as aluminum, gold or other metal suitable for ohmic contact, as indicated at 54 of FIG. 5.

It will be appreciated that a complete ROM incorporates additional circuitry beyond the memory matrix described herein; thus, there may be incorporated in a complete unit a decoder and driver to apply signals to the matrix and enable an output circuitry to produce output signals corresponding to the information stored in tne matrix. Such circuitry is, however, conventional and the matrix of the present invention is adapted to operate therewith in the same manner, for example, as a conventional diode matrix of commercially available types.

There has been described above an improved READ ONLY MEMORY device and process of manufacturing same. It has been found that this process yields reproducible results and, in fact, the final resistance of the shorted base-emitter junction of any matrix transistor may be established at any desired level with a high degree of precision. There is thus provided by this invention a material advancement in the art and it is to be understood that the invention encompasses those modifications and variations that are, in fact, within the scope of the invention.

What is claimed is:

1. A process of manufacturing an integrated circuit READ ONLY MEMORY matrix comprising the steps of diffusing transistors into a die in rows with each row thereof having a common collector, attaching a separate electrical contact to each common collector, forming electrical contacts in separate columns extending transversely of said rows with each column contact engaging the emitter of a transistor in a separate row thereof, applying pulsed electrical power between selected collector contacts and column contacts with the proper polarity and sufficient current to cause progressive degradation of the base-emitter junction of the transistor connected between said contacts, and continuously monitoring the reverse current resistance of the base-emitter junction of the transistor while applying said pulsed electrical power and terminating the application of power when the resistance decreases to a predetermined value.

2. The process of claim 1 further defined by applying a monitor pulse to said transistor between each power pulse for accomplishing said monitoring of the resistance of the base-emitter junction of the transistor to reverse current flow.

3. The process of claim 1 further defined by limiting the pulse height and pulse width of said power pulses to incrementally degrade the base-emitter junction with each pulse application.

4. The process of claim 3 further defined by monitoring the reverse current resistance of the base-emitter junction by applying low current reverse bias monitoring pulses across said base-emitter junction and terminating application of said power pulses upon predetermined reverse junction voltage with said monitor pulses.

5. A process of manufacturing an integrated circuit READ ONLY MEMORY matrix comprising the steps of forming a plurality of transistors in a die in rows with each row thereof having a common collector, attaching a separate electrical contact to each common collector, forming electrical contacts in separate columns extending transversely of said rows with each column contact engaging the emitter of a transistor in a separate row thereof, applying pulsed electrical power between the collector and emitter of a selected transistor of said matrix with sufficient current to incrementally degrade the base-emitter junction thereof, monitoring the resistance between the collector and emitter contacts of the selected transistor during pulsed power application as a measure of base-emitter junction resistance, and terminating power application at predetermined monitored resistance of the base-emitter junction to prevent damage to the adjacent base-collector junction of the selected transistor.

6. The process of claim 5 further characterized by monitoring the resistance of the base-emitter junction by applying low level monitoring pulses between application of power pulses, and terminating application of power pulses at a predetermined emitter to collector resistance of the selected transistor.

* * * * *